Oct. 24, 1950     H. J. KUHLMAN     2,527,190
HUSK AGITATOR FOR CORN PICKING MACHINES
Filed Jan. 7, 1947     2 Sheets-Sheet 1
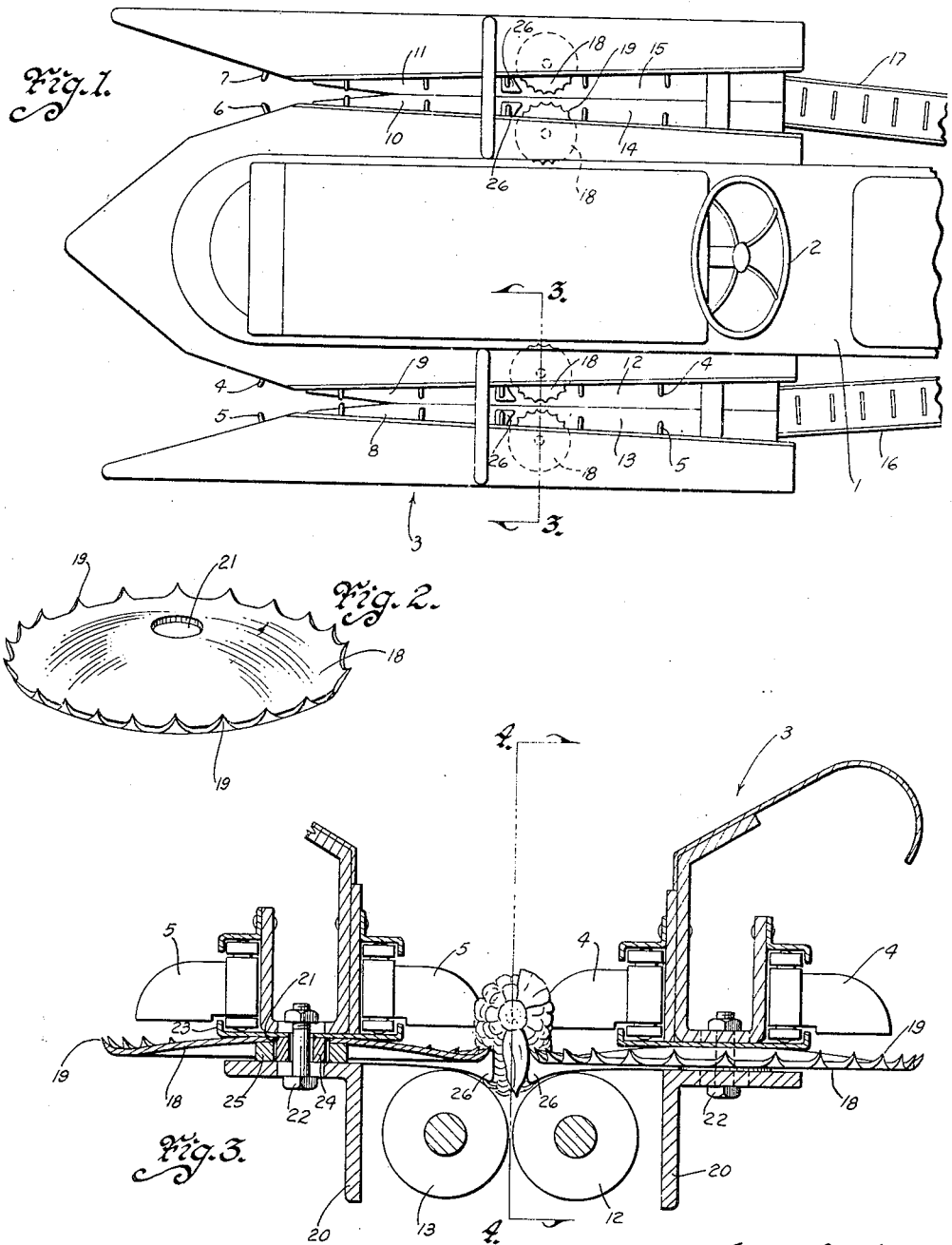

Oct. 24, 1950 H. J. KUHLMAN 2,527,190
HUSK AGITATOR FOR CORN PICKING MACHINES
Filed Jan. 7, 1947 2 Sheets-Sheet 2
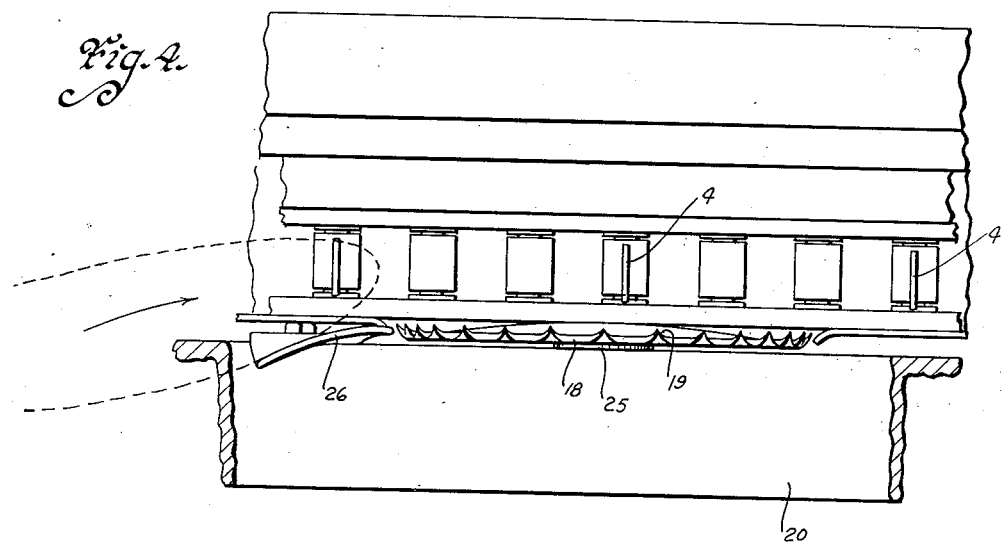
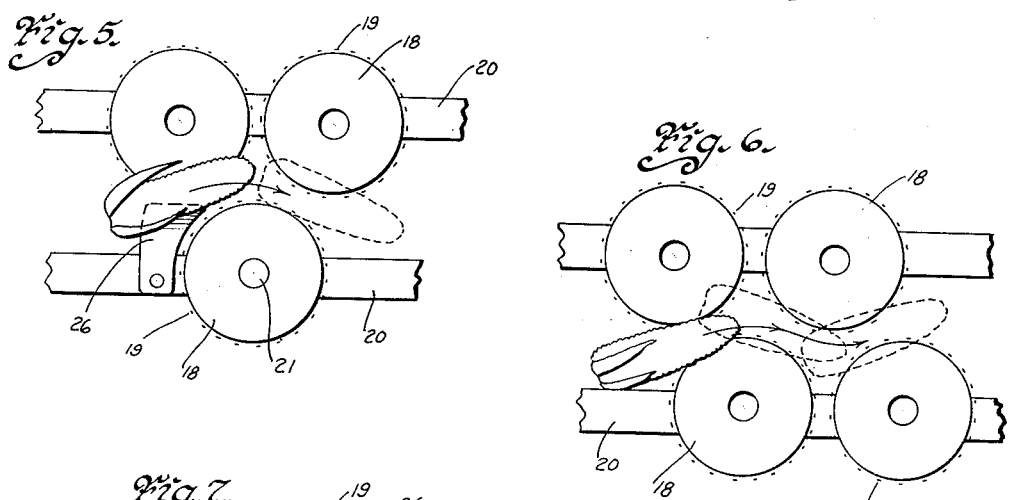
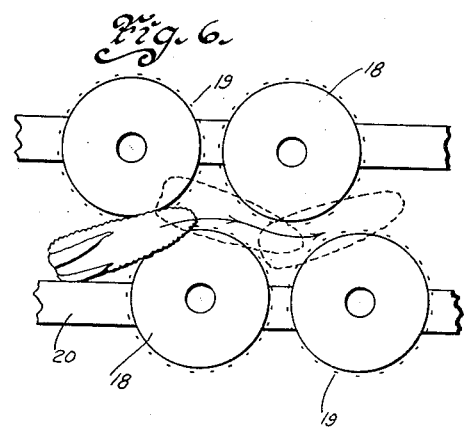
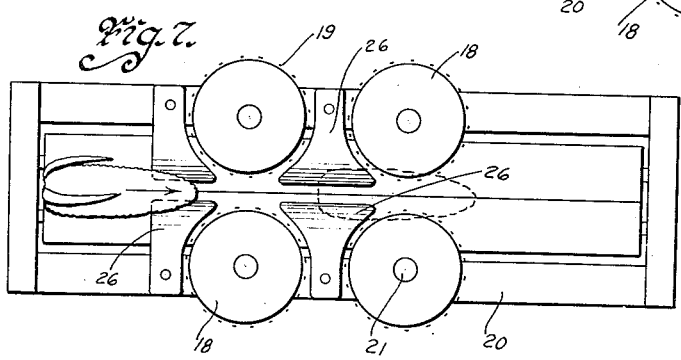
Inventor
Henry J. Kuhlman
by Harry L. Yunger
Attorney
Witness
Edward P. Seelert Patented Oct. 24, 1950

2,527,190

UNITED STATES PATENT OFFICE 2,527,190

HUSK AGITATOR FOR CORN PICKING MACHINES

Henry J. Kuhlman, Waterloo, Iowa

Application January 7, 1947, Serial No. 720,635

3 Claims. (Cl. 130—5)

The present invention relates to an improvement in corn pickers and more particularly to a pointed rotating disc member over which an ear of corn passes after being snapped from a corn stalk to have portions of the husk, remaining on the ear of corn, pulled outwardly to give means for the husking rollers to grasp to remove all the husk from the ear of corn.

Corn pickers are now in use that depend upon snapping rollers to snap the ear of corn from a corn stalk and at the same time husk the ear of corn. Corn pickers of this type will operate efficiently under proper weather conditions and proper conditions of the corn but more often than not, the husk is not removed from the ear of corn. Husking rollers have been added to corn pickers over which the ears of corn pass after being snapped from the corn stalk in an effort to remove the husk remaining on the ears of corn after the snapping act. The husking rollers are efficient and remove the husk if they are able to grasp a small sliver of the husk but sometimes the husk is so tightly wrapped around the ear of corn that nothing projects from the ear of corn that can be grasped by the husking rollers. In this instance the husking rollers will not remove any husks from the ears of corn.

It is an object of the invention, among others, to provide a means on a corn picker to roughen or shred the husk remaining on an ear of corn to give a projection for the shucking rollers to grasp; to provide a means on a corn picker to roughen or shred the husk remaining on an ear of corn without injury to the kernels of corn on the ear of corn; to provide a means or a series of means on a corn picker spaced in any desirable fashion to roughen or shred the husk remaining on an ear of corn; a means or a series of means on a corn picker to roughen or shred the husk remaining on an ear of corn that is simple in construction and hence easy to manufacture and also simple to mount on the corn picker and easy to operate; and a means or a series of means on a corn picker to roughen or shred the husk remaining on an ear of corn that is economical in construction and durable, economical and long lasting in operation.

In carrying out the objects of the invention there is provided a corn picker having a gathering chain, snapping rollers and husking rollers. The improvement to the corn picker comprises a disc over which an ear of corn passes after being snapped from the corn stalk by the snapping rollers. Means are provided on the disc, which may be pointed projections around the outer periphery of the disc, to dig into the husk remaining on the ear of corn to pull out portions of the husk to provide means for the husking rollers to grasp to remove the husk from the ear of corn. The disc may be rotatably mounted on the corn picker. A plurality of discs may be employed with the discs spaced apart. In one species the discs may be mounted directly opposite each other while in another species the discs opposite each other may be staggered. The discs are rotated by an ear of corn passing over the discs after being snapped from the corn stalk.

With the foregoing and other objects in view, the invention will be more fully described hereinafter and will be particularly pointed out in the claims appended hereto.

In the drawings wherein like symbols refer to like or corresponding parts throughout the several views:

Figure 1 is a top plan view looking down on a corn picker structure mounted on a tractor.

Figure 2 is a perspective view of a disc member.

Figure 3 is a sectional view taken on the line 3—3 of Figure 1.

Figure 4 is a sectional view taken on the line 4—4 of Figure 3.

Figure 5 is a partial plan view of a corn picker showing one arrangement of mounting the discs.

Figure 6 is a partial plan view of a corn picker showing another arrangement of mounting the discs.

Figure 7 is a partial plan view of a corn picker showing still another arrangement of mounting the discs.

In Figure 1 a tractor is represented generally at 1 with a steering wheel of the tractor prominently shown at 2. A corn picker 3 is shown mounted on the tractor, which as shown is a two row picker with the usual guide members to guide corn stalks into gathering chains 4 and 5 for one row and 6 and 7 for the other row. The gathering chains are covered and protected in the usual manner. The gathering chains cooperate with snapping rollers 8 and 9 and 10 and 11. The snapping rollers snap an ear of corn from a corn stalk that is guided into the snapping rollers. The snapping rollers are inclined upwardly from the front of the corn picker with the lower portion of a corn stalk entering the snapping rollers. The rollers are spaced apart slightly, having a larger spacing at the entering end of the rollers which gradually diminishes. The snapping rollers are rotating in opposite directions so as to draw a corn stalk into and through the snapping rollers. The ear of corn on the corn stalk, when reached, is too large to pass through the snapping rollers whence it is snapped free of the corn stalk and the corn stalk passes on through the snapping rollers. The ear of corn is picked up by the gathering chains 4 and 5 or 6 and 7 and moved upwardly to husking rollers 12 and 13; and 14 and 15. An ear of corn passes over the husking rollers and an effort is made to remove any husk remaining on the ear of corn after the snapping act. The husking rollers, best shown at 12 and 13 in cross section in Figure 3 are spaced with a small space therebetween and rotate in opposite directions. An ear of corn is advanced by gathering chains 4 and 5 into the space between the husking rollers 12 and 13 and the husking rollers 12 and 13 grasp any projections on the husks remaining on an ear of corn after the snapping act and run the husk through the husking rollers 12 and 13 to remove the husk from the ear of corn. After the ear of corn passes over the husking rollers it enters elevators 16 and 17 and is conveyed to a wagon attached to the corn picker in the usual manner.

A disc 18 is shown in Figure 2 having means 19 to roughen or shred any husk remaining on an ear of corn. The means 19 are sharp projections, coming to a needle point which projections or points 19 dig into the husk remaining on an ear of corn to rip, tear, pull, shred or generally roughen the husk remaining on an ear of corn so projections may be presented to the husking rollers for the husking rollers to grasp the projecting portions of the husk and thus remove the whole husk from the ear of corn.

As shown in Figures 1 and 3, the disc 18 is mounted on a structural member 20 of the corn picker 3. The disc 18 has an opening 21 in the center thereof and a bolt 22 passes through the structural member 20 and opening 21 in the disc 18 to attach the disc to the corn picker. A guard 23 for chain 5 provides a top clamp for disc 18 and is clamped by bolt 22 with a spacer 24 between guard 23 and structural member 20. A spacer member 25 is placed between dic 18 and structural member 20. The disc 18 is so mounted therefore that it is readily rotatable about spacer 24 as an axle. One disc could be employed with efficient results but Figures 1 and 3 show two discs over which and ear of corn passes before reaching the husking rollers. The gathering chains 4 and 5 advance the ear of corn onto the disc 18 with guide members 26, one of which is best shown in Figure 4, guiding and directing the ear of corn onto the disc 18. The ear of corn rests on disc 18 as shown in Figure 3, with the weight of the corn pressing down on the pointed projections 19. The projections 19 dig into any husk remaining on the ear of corn; the gathering chain 5 continues to move the ear of corn forward and the ear of corn in moving forward rotates discs 18. The ear of corn in moving over the discs therefore has a maximum of pointed projections 19 digging into its husk and same projections 19 are sure to tear the husks and leave portions that the husking rolls can grasp. If the ear of corn is husked when it arrives at the discs 18, the corn is dried and so hard the pointed projections 19 will not dig into the corn kernels to injure the same.

Figure 5 shows a schematic arrangement showing how three discs 18 may be arranged. The ear of corn takes a tortuous path through the staggered discs 18 with the tortuous path presenting greater opportunity for tearing portions of the husk loose. Figure 6 shows how four discs 18 may be arranged in staggered fashion to present a longer tortuous path if desired. Figure 7 shows four discs arranged in pairs, directly opposite each other to present a straight through path for the corn with the discs 18 having two chances at the ear of corn passing through. Whether one or more discs 18 are employed depends entirely on weather conditions, condition of the corn and the amount of husk remaining on the ear of corn. The number of discs 18 to be used and their arrangement can well be determined any day that corn picking is in progress.

It will be understood that the invention has been described for purposes of illustration and explanation and that changes and variations are possible without departing from the scope of the invention. All such modifications and changes are intended to be included in the appended claims.

I claim:

1. In a corn picker having a gathering chain, snapping rollers and a pair of husking rollers, the improvement comprising a plurality of opposed discs mounted to freely rotate about a substantially vertical axis, in a plane adjacent and above the pair of husking rollers with the opposed peripheries of the discs substantially between the rollers, an ear of corn passing over the discs after being snapped from the corn stalk by the snapping rollers, upwardly directed pointed projections around the outer peripheries of the discs over which the ear of corn passes before it reaches the husking rollers and said gathering chain and the weight of the ear of corn forcing the ear of corn into the pointed projections so they dig into the husk remaining on the ear of corn and pulling out portions of the husk to provide means for the husking rollers to grasp to remove the husk from the ear of corn.

2. In a corn picker having a gathering chain, snapping rollers and a pair of husking rollers, the improvement comprising a pair of discs mounted to freely rotate about a substantially vertical axis, in a plane adjacent and above the pair of husking rollers with the opposed peripheries of the discs substantially between the rollers, said discs being directly opposite each other and spaced apart, an ear of corn passing over the discs after being snapped from the corn stalk by the snapping rollers, upwardly directed pointed projections around the outer peripheries of the discs over which the ear of corn passes before it reaches the husking rollers and said gathering chain and the weight of the ear of corn forcing the ear of corn into the pointed projections so they dig into the husk remaining on the ear of corn and pulling out portions of the husk to provide means for the husking rollers to grasp to remove the husk from the ear of corn.

3. In a corn picker having a gathering chain, snapping rollers and a pair of husking rollers, the improvement comprising a plurality of discs mounted to freely rotate about a substantially vertical axis, in a plane adjacent and above the pair of husking rollers with the opposed peripheries of the discs substantially between the rollers, opposite discs being spaced from each other and staggered, an ear of corn passing over the discs after being snapped from the corn stalk by the snapping rollers, upwardly directed pointed projections around the outer peripheries of the discs over which the ear of corn passes before it reaches the husking rollers and said gathering chain and the weight of the ear of corn forcing the ear of corn into the pointed projections so they dig into the husk remaining on the ear of corn and pulling out portions of the husk to provide means for the husking rollers to grasp to remove the husk from the ear of corn.

HENRY J. KUHLMAN.

REFERENCES CITED

The following references are of record in the file of this patent:

UNITED STATES PATENTS

| Number | Name | Date |
|---|---|---|
| 77,494 | Jones | May 5, 1868 |
| 407,423 | Stickney | July 23, 1889 |
| 497,693 | Taylor | May 16, 1893 |
| 882,472 | Latchford | Mar. 17, 1908 |
| 1,142,181 | Kranich | June 8, 1915 |
| 1,288,301 | Vincent | Dec. 17, 1918 |
| 1,922,374 | Krause | Aug. 15, 1933 |
| 2,169,070 | Kuhlman | Aug. 8, 1939 |
| 2,239,899 | Nightenhelser et al., | April 29, 1941 |